(12) United States Patent
Salter et al.

(10) Patent No.: US 11,691,547 B2
(45) Date of Patent: Jul. 4, 2023

(54) VEHICLE HAVING REAR FACING TAILGATE SEATING ASSEMBLY

(71) Applicant: Ford Global Technologies, LLC, Dearborn, MI (US)

(72) Inventors: Stuart C. Salter, White Lake, MI (US); David Brian Glickman, Southfield, MI (US); Paul Kenneth Dellock, Northville, MI (US); Sean Bayle West, Monroe, MI (US); Johnathan Andrew Line, Northville, MI (US); Peter Phung, Windsor (CA); Kevin Wayne Preuss, Berkley, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 189 days.

(21) Appl. No.: 17/343,889

(22) Filed: Jun. 10, 2021

(65) Prior Publication Data
US 2022/0396186 A1 Dec. 15, 2022

(51) Int. Cl.
*B60N 3/06* (2006.01)
*B60N 2/30* (2006.01)

(52) U.S. Cl.
CPC ......... *B60N 2/3095* (2013.01); *B60N 2/3093* (2013.01); *B60N 3/06* (2013.01)

(58) Field of Classification Search
CPC ...... B60N 2/3095; B60N 2/3093; B60N 3/06; B60N 2/3088; B60N 2/045; B60N 2/36; B60N 2/1615; B60N 2/162
See application file for complete search history.

(56) References Cited

U.S. PATENT DOCUMENTS

| | | | |
|---|---|---|---|
| 5,927,679 A * | 7/1999 | Hill | B60N 2/505 248/588 |
| 9,108,533 B2 * | 8/2015 | Suck | B60N 2/07 |
| 9,694,741 B2 * | 7/2017 | Salter | B60N 2/62 |
| 10,737,588 B2 * | 8/2020 | Fujita | B60N 2/067 |
| 2004/0256894 A1 * | 12/2004 | McManus | B60N 2/2231 297/93 |
| 2005/0253433 A1 * | 11/2005 | Brown | B60N 2/233 297/283.3 |
| 2009/0079248 A1 | 3/2009 | Keyser et al. | |
| 2016/0144744 A1 | 5/2016 | Jeong et al. | |
| 2019/0217748 A1 | 7/2019 | Kmja | |
| 2020/0269728 A1 * | 8/2020 | Pelka | B60N 2/0727 |
| 2021/0162887 A1 * | 6/2021 | Taylor | B60N 2/3095 |
| 2021/0178940 A1 * | 6/2021 | Fakhoury | A47C 17/80 |

FOREIGN PATENT DOCUMENTS

JP 000H06901 U 1/1994

* cited by examiner

*Primary Examiner* — Amy R Weisberg
*Assistant Examiner* — Sara Laghlam
(74) *Attorney, Agent, or Firm* — Vichit Chea; Price Heneveld LLP (57) ABSTRACT

A vehicle includes a cabin interior, a floor, and a deployable seat assembly. The deployable seat assembly includes a pair of deployable seat support assemblies, each having first and second pivot bars pivotally supported on the floor, a first rail coupled to the first and second pivot bars, wherein the first rail is raised and lowered as the first and second pivot bars rotate between first and second bar positions, and a second rail slidingly extendable from the first rail. The seat assembly has a seat supported by the second rail, wherein the seat faces rearward and extends rearward on the second rail as the second rail slides away from the first rail.

17 Claims, 11 Drawing Sheets

VEHICLE HAVING REAR FACING TAILGATE SEATING ASSEMBLY

FIELD OF THE DISCLOSURE

The present disclosure generally relates to vehicles, such as motor vehicles, and more particularly relates to a vehicle rear seat that can be deployed to a rearward facing tailgate seating position.

BACKGROUND OF THE DISCLOSURE

Motor vehicles are commonly equipped with front and rear rows of seating to provide seating for passengers. Some vehicles may be equipped with tailgate seating to allow one or more passengers to be seated at the rear end of the vehicle facing rearward with the tailgate open when the vehicle is parked. It would be desirable to provide for a seating arrangement for a vehicle that offers deployable tailgate seating and is cost-effective and easy to use.

SUMMARY OF THE DISCLOSURE

According to a first aspect of the present disclosure, a vehicle is provided that includes a cabin interior, a floor, and a deployable seat assembly. The deployable seat assembly includes a pair of deployable seat support assemblies, each deployable seat support assembly including first and second pivot bars pivotally supported on the floor, a first rail coupled to the first and second pivot bars, wherein the first rail is raised and lowered as the first and second pivot bars rotate between first and second bar positions, and a second rail slidingly extendable from the first rail. The vehicle also includes a seat supported by the second rail, wherein the seat faces rearward and extends rearward on the first rail as the second rail extends rearward away from the first rail.

Embodiments of the first aspect of the disclosure can include any one or a combination of the following features:
- each of the seat support assemblies comprises third and fourth pivot bars coupled to the second rail and the seat, wherein the seat may be raised and lowered relative to the second rail as the third and fourth pivot bars rotate;
- the third and fourth pivot bars pivot in the range of 90° to 150°;
- the first and second pivot bars pivot in the range of 90° to 150°;
- a well recessed in the floor, wherein the seat is disposed at least partially within the well in a stowed position;
- the seat extends rearward of the cabin interior in a use position;
- a tailgate at the rear of the cabin interior, wherein the tailgate is in an open position when the seat assembly is in the use position;
- the rear facing seat comprises a seat base and a seat back;
- the seat base pivots relative to the seat back between a folded position and a use position;
- the second rail telescopes from the first rail;
- a ball bearing rack on at least one of the first and second rails;
- a pin connecting the second rail to the first rail;
- a footrest coupled to the seat assembly, wherein the footrest extends to a deployed footrest position from a stored footrest position; and
- a lighting device proximate a front edge of the seat for illuminating an area rearward of the seat assembly in the use position.

According to a second aspect of the present disclosure, a vehicle is provided that includes a cabin interior, a floor, and a deployable seat assembly. The deployable seat assembly includes a pair of deployable seat support assemblies, each deployable seat support assembly including first and second pivot bars pivotally supported on the floor, a first rail coupled to the first and second pivot bars, wherein the first rail is raised and lowered as the first and second pivot bars rotate between first and second bar positions, a second rail slidingly extendable from the first rail, and third and fourth pivot bars coupled to the second rail, wherein the seat may be raised and lowered relative to the second rail. The deployable seat assembly also includes a seat supported by the second rail, wherein the seat faces rearward and extends rearward on the first rail as the second rail slides away from the first rail.

Embodiments of the second aspect of the disclosure can include any one or a combination of the following features:
- a well recessed in the floor, wherein the seat assembly is disposed at least partially within the well in a stowed position;
- the seat assembly extends rearward of the cabin interior in a use position; and
- a tailgate at the rear of the cabin interior, wherein the tailgate in an open position when the seat assembly is in the use position.

According to a third aspect of the present disclosure, a seat assembly for a vehicle, the seat assembly including a pair of seat support assemblies, each seat support assembly including first and second pivot bars configured to be pivotally supported on a floor of the vehicle, a first rail coupled to the first and second pivot bars, wherein the first rail is raised and lowered as the first and second pivot bars rotate between first and second pivot bar positions, a second rail slidingly extendable from the first rail, and a seat supported by the second rail, wherein the seat faces rearward and extends rearward on the first rail as the second rail slides away from the first rail.

An embodiment of the third aspect of the disclosure can include any one or a combination of the following features:
- each of the seat support assemblies comprises third and fourth pivot bars coupled to the second rail and the seat assembly, wherein the seat assembly may be raised and lowered relative to the second rail as the third and fourth pivot bars rotate.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present disclosure are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

Figure 1:
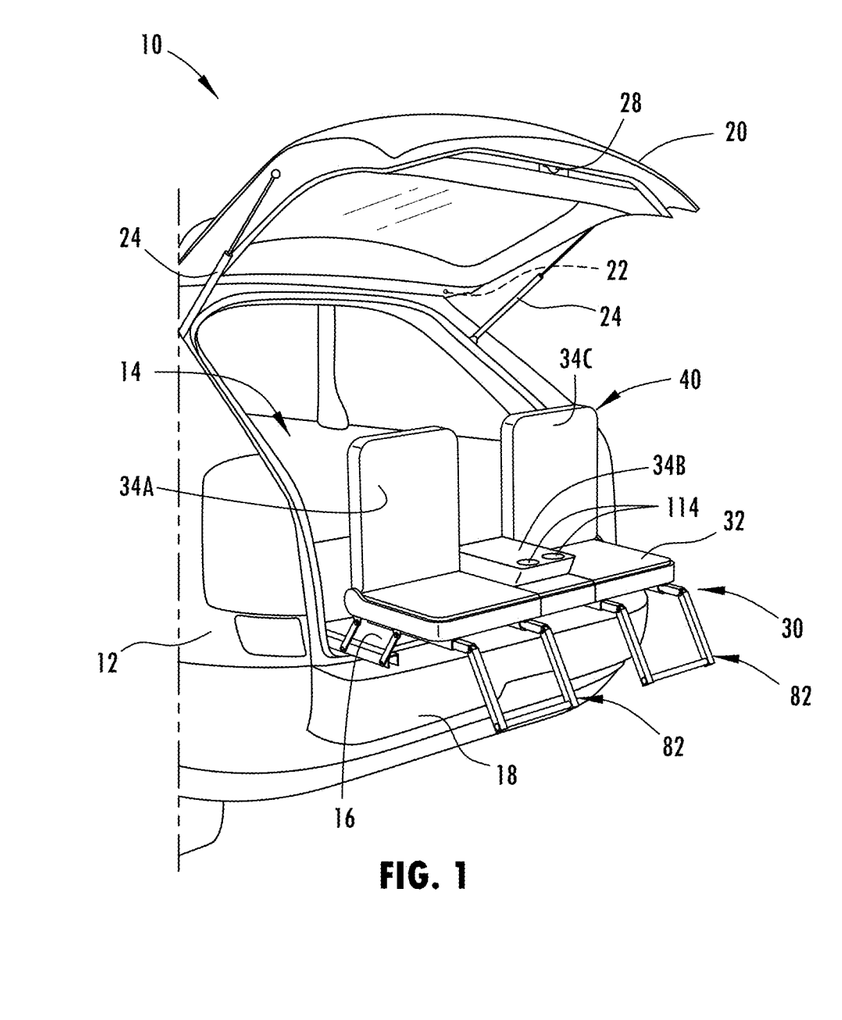
FIG. 1 is a rear perspective view of a motor vehicle having a rearward facing seat assembly arranged in a tailgating position, according to one embodiment.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle having a deployable rear facing seat that offers tailgate seating. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIG. 1, the cabin interior 14 of a wheeled automotive or motor vehicle 10 is generally illustrated configured with passenger seating for transporting passengers in the vehicle 10 and with a deployable seat assembly 30 to provide rear facing tailgate seating when the vehicle is parked. The cabin interior 14 is generally defined by a vehicle body 12 and may include various features and trim components within the cabin interior 14. The cabin interior 14 may include an arrangement of passenger seats, including a first or front row of driver and passenger seats (not shown) at the front of the cabin interior 14 and one or more rear rows of passenger seats (not shown) located rearward of the front row of passenger seats.

Figure 2A:
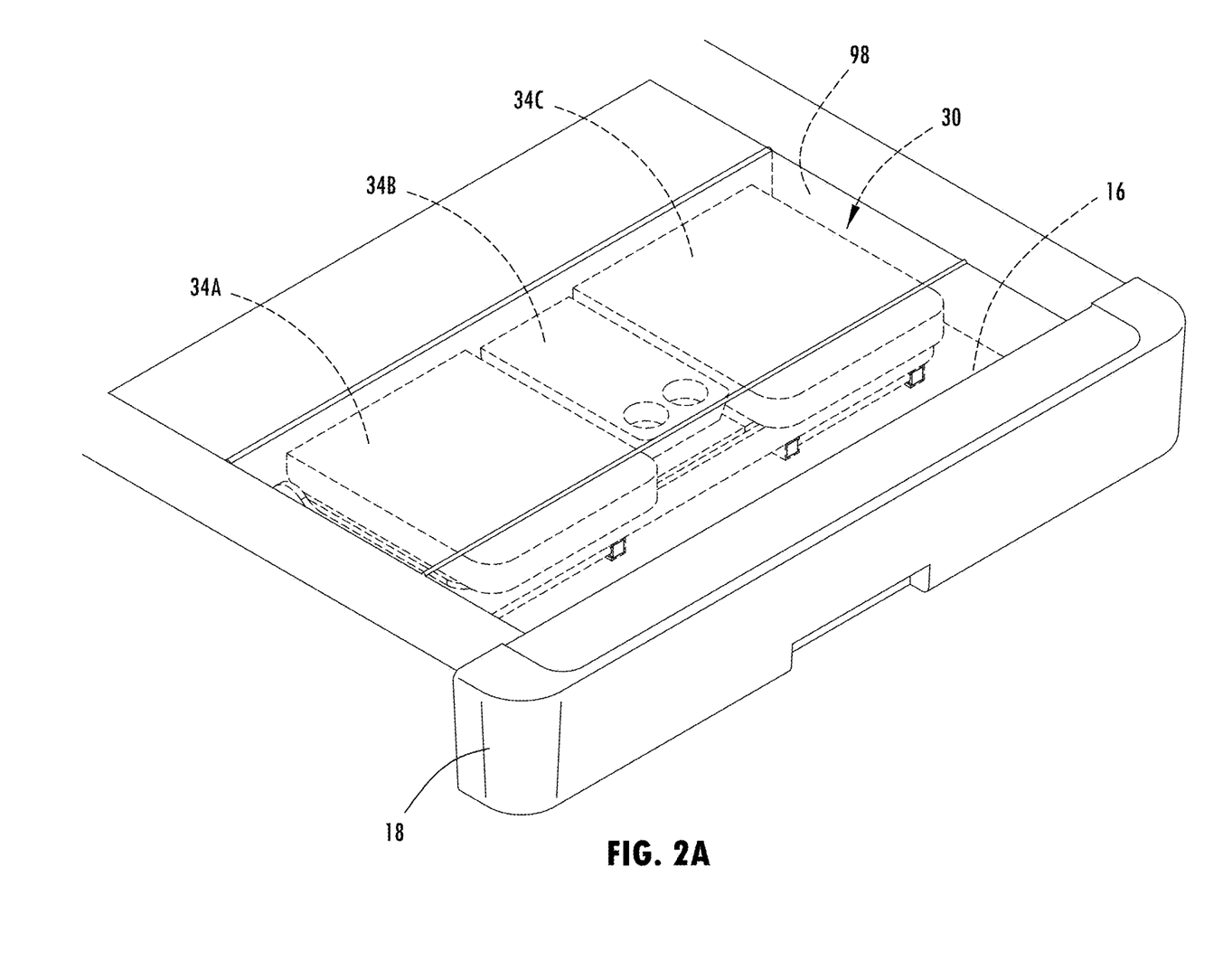
FIG. 2A is a rear perspective view of the seating assembly shown in a stowed position within a well of a floor of the vehicle.
Figure 2B:
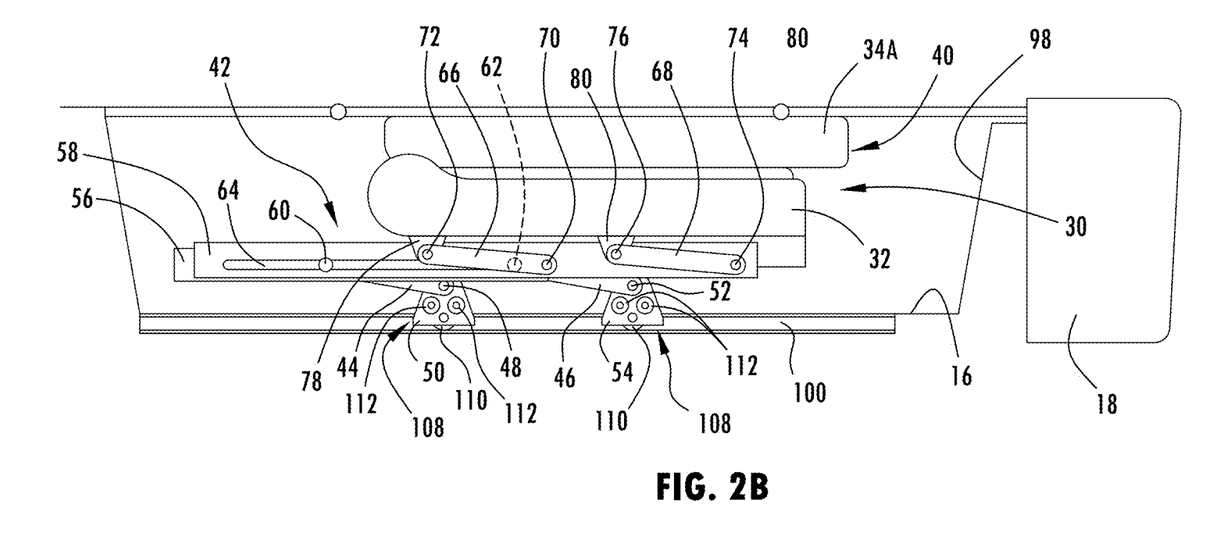
FIG. 2B is a side view of the seating assembly as shown in FIG. 2A in the stored position within the vehicle well.

In addition, the vehicle 10 includes the deployable rear facing tailgate seat assembly 30 that provides rear facing tailgate seating at the rear end of the vehicle 10. The seat assembly 30 may be stowed within a well in the floor 16 of the vehicle 10 in a stowed position as shown in FIGS. 2A and 2B and may be deployed to a rearward extended use tailgate position shown in FIG. 1. The seat assembly 30 is generally shown as a split bench seat having a seat base 32 and three split seat backs 34A, 34B and 34C. However, it should be appreciated that the seat assembly 30 may include a bench seat or individual seats (e.g., captains seats), according to other embodiments.

The vehicle 10 may also possess additional rows of seating, as is typical in large SUVs, vans and buses. The vehicle body 12 further defines the floor 16 upon which the seating arrangement is supported. It should be appreciated that the vehicle 10 may be a motor vehicle, such as a wheeled car, truck, SUV, van or bus, for example, having a tailgate and capable of transporting one or more passengers and for seating one or more passengers in the deployed tailgate seating position of the seat assembly 30.

The vehicle 10 includes a tailgate 20 at the rear end 18 of the body 12. The tailgate 20 is shown configured as an upper tailgate that defines a tailgate closure that closes a space of the cabin interior 14 defined by the body 12 at the rear end 18 of the vehicle 10 in the closed tailgate position, and allows access to the cabin interior 14 and allows the seat assembly to extend rearward from the cabin interior 14 in the open tailgate position. The tailgate 20 pivots about upper pivots 22 on opposite lateral sides and is supported in the open tailgate position by support arms 24 on opposite lateral sides. The tailgate 20 may be substantially vertical in the closed position and may rotate to a position at or above a horizontal position by an angle in the range of about 90°-120°, for example. The tailgate 20 may include a connector such as a latch 28 that releasibly connects onto a striker bolt or other connector on the vehicle body 12 in the closed tailgate position. It should be appreciated that the tailgate 20 may be manually movable between open and closed tailgate positions or may be powered to move between the open and closed tailgate positions with one or more actuators, such as motors, or may include an assist mechanism, e.g., springs, for assisting in moving the tailgate 20 between the open and closed tailgate positions. It should further be appreciated that the tailgate 20 may otherwise be configured such as to include a lower tailgate that pivots to a substantially horizontal position in the open tailgate position and an upper tailgate that matingly engages the lower tailgate to form the tailgate closure in the closed tailgate position. Further, other vehicle tailgates are conceivable, such as one or more tailgate doors that pivot about vertical hinges.

Referring to FIGS. 2A and 2B, the seat assembly 30 is generally illustrated collapsed and stowed within a recessed well 98 in the floor 16 of vehicle 10 in the fully stowed position. As such, the seat assembly 30 may be compactly stored within the floor well 98 so as to minimize the consumption of space within the cabin interior 14 when the seat assembly 30 is not in use. The recessed well 98 and stowed seat assembly 30 may be covered with a cover panel to hide the seat assembly 30 from view and to provide a surface flush with the surrounding floor.

Figure 3A:
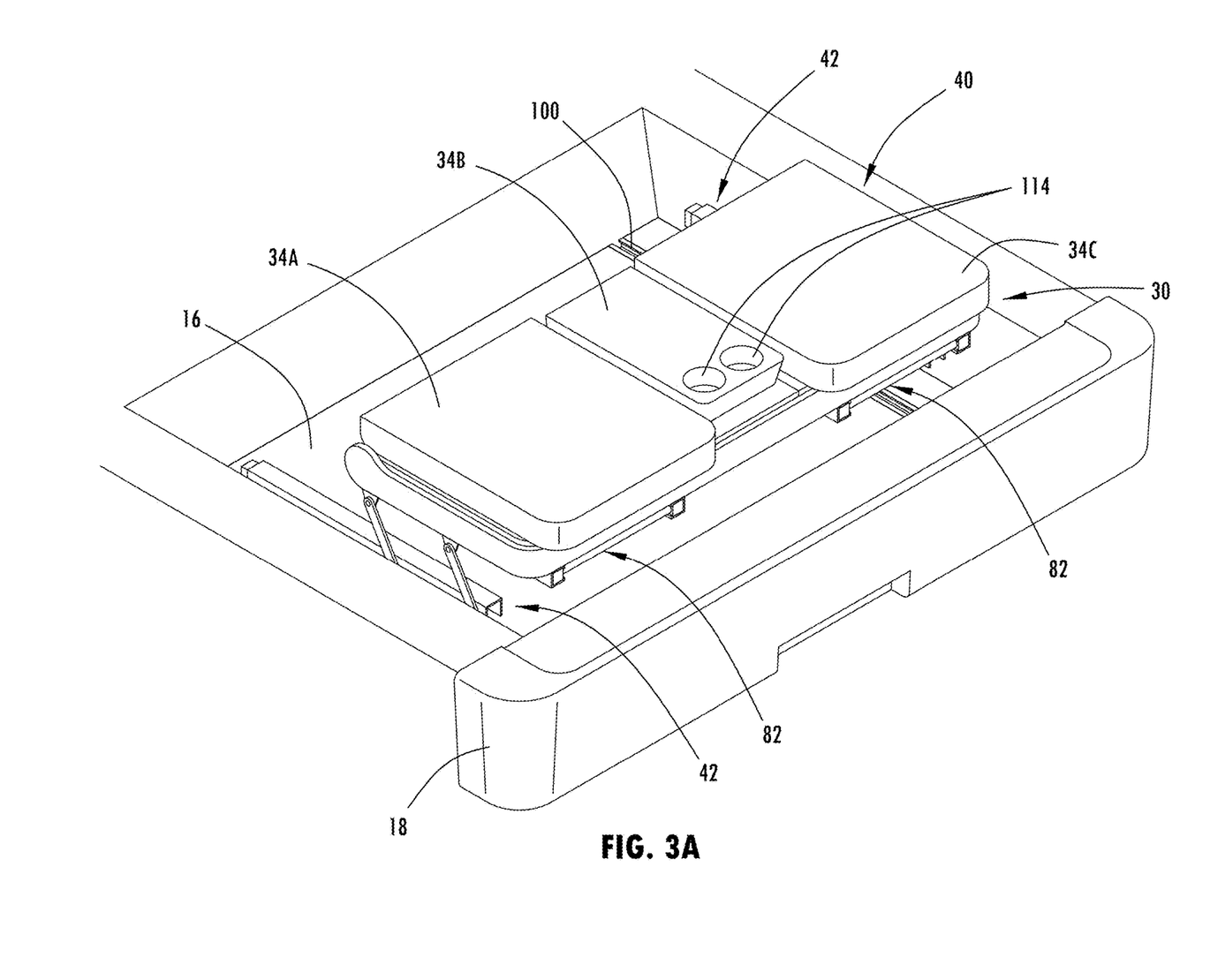
FIG. 3A is a rear perspective view of the seating assembly shown partially deployed to an upright position above the vehicle floor well.
Figure 3B:
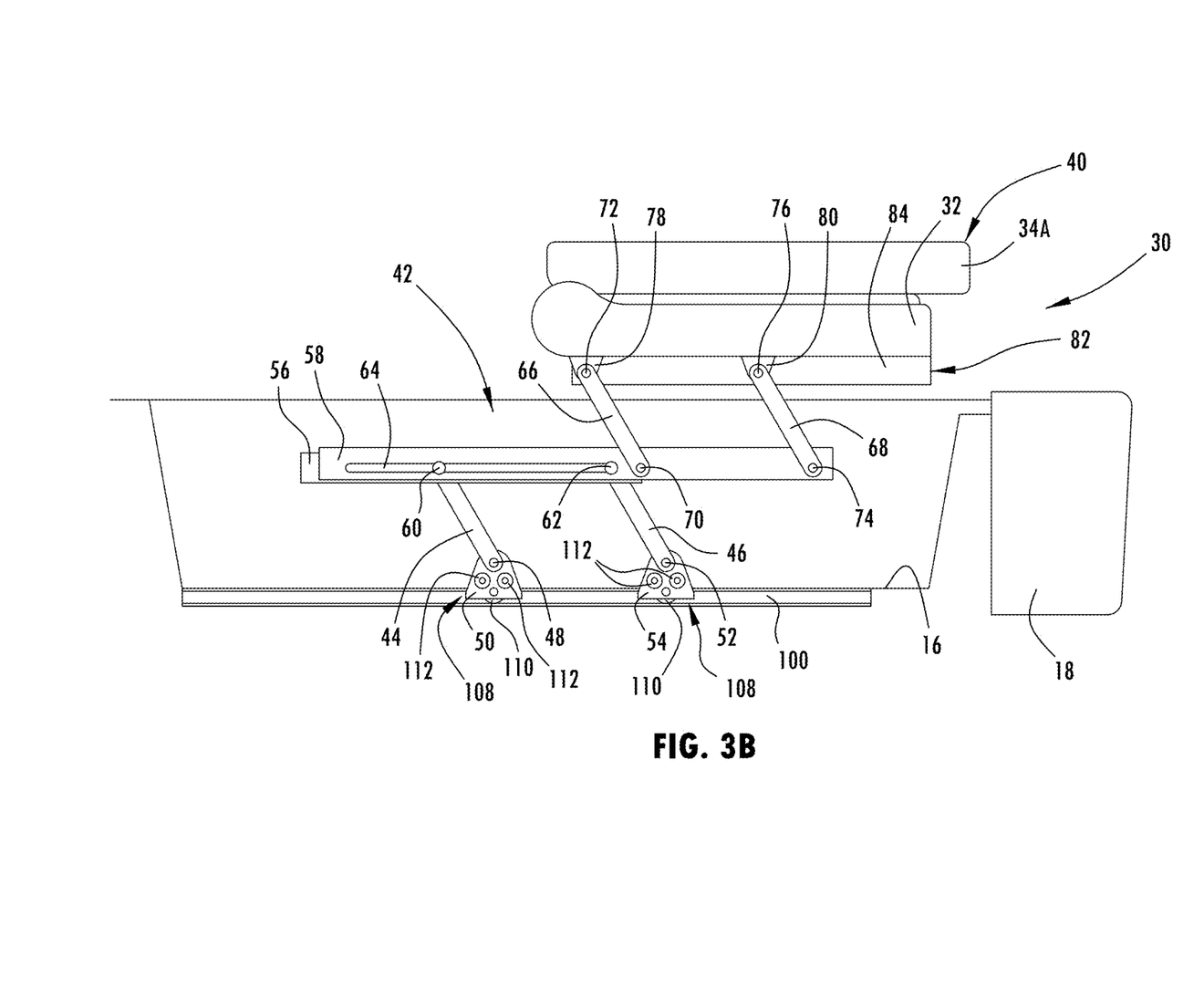
FIG. 3B is a side view of the seating assembly shown partially deployed as shown in FIG. 3A.

Referring to FIGS. 3A and 3B, the seat assembly 30 is shown in a partially deployed position partially lifted and removed from the floor well 98. The deployable seat assembly 30 includes a pair of deployable seat support assemblies 42 provided on opposite lateral sides of the seat assembly 30. The deployable seat support assemblies 42 support a seat 40 and together direct the movement of the seat 40 on opposite lateral sides. Each deployable seat support assembly 42 has a lower first pivot bar 44 and a lower second pivot bar 46 supported on the floor 16 via a brackets 50 and 54 via pins 48 and 52. The bracket 54 may slide forward and rearward on a track 100 connected to the floor 16 in the embodiment shown. The first and second pivot bars 44 and 46 pivot between a stowed position shown in FIGS. 3A and 3B and pivot upward to a position rotated beyond that shown in FIGS. 3A and 3B. During the pivoting movement, the first and second pivot bars 44 and 46 lift the seat 40 upward and moves the seat 40 rearward.

The first and second pivot bars 44 and 46 are coupled to a rail assembly that includes a front first rail 56 and a rear second rail 58. The first and second pivot bars 44 and 46 are coupled to the first rail 56. The second rail 58 may slide rearward relative to the first rail 56 to telescope outward to an extended position during deployment. The second rail 58 has a shape and size that matingly engages the first rail 56 to allow the second rail 58 to slide relative to the first rail 56. The upper end of first pivot bar 44 has a connector 60 connected to the first rail 56 and the second pivot bar 46 has a connector 62 on the upper end connected to the first rail 56. The second rail 58 has a slot 64 that allows telescoping movement of the second rail 58 to extend from and retract into the first rail 56 and allow the connectors 60 and 62 to slide within slot 64.

Figure 4A:
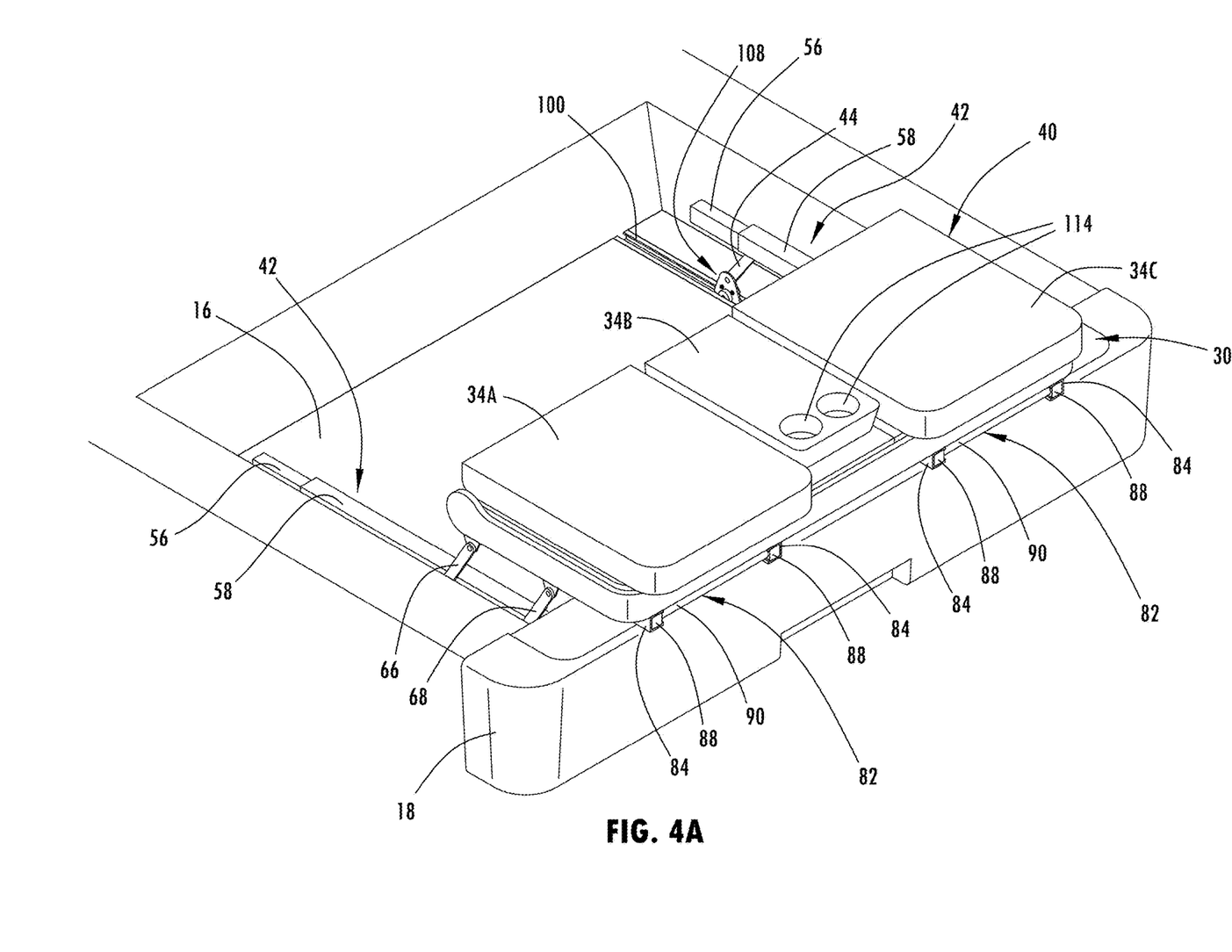
FIG. 4A is a rear perspective view of the seating assembly shown further deployed in an intermediate position further rearward on the vehicle.
Figure 4B:
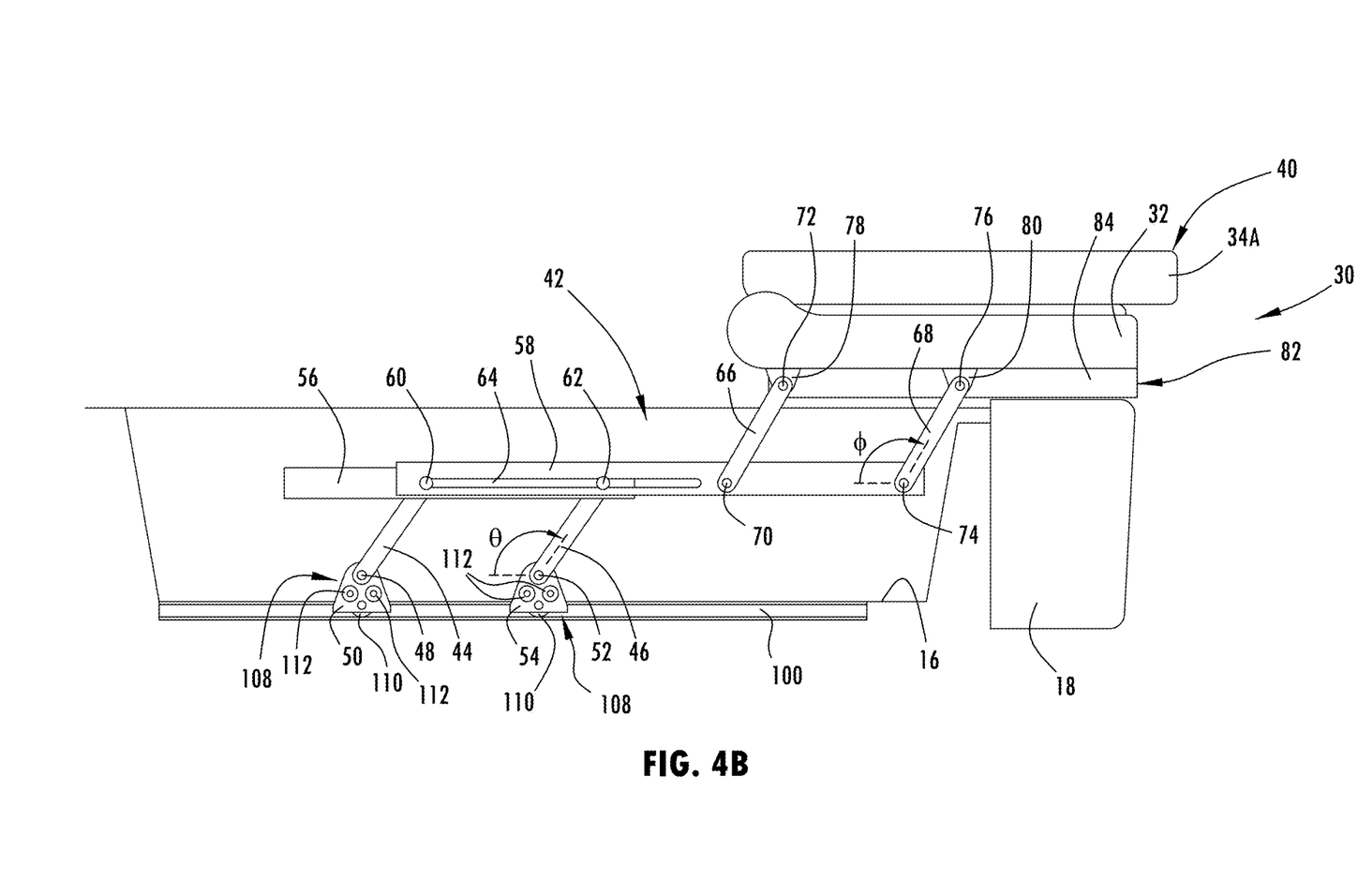
FIG. 4B is a side view of the seating assembly in the intermediate deployed position shown in FIG. 4A.
Figure 5A:
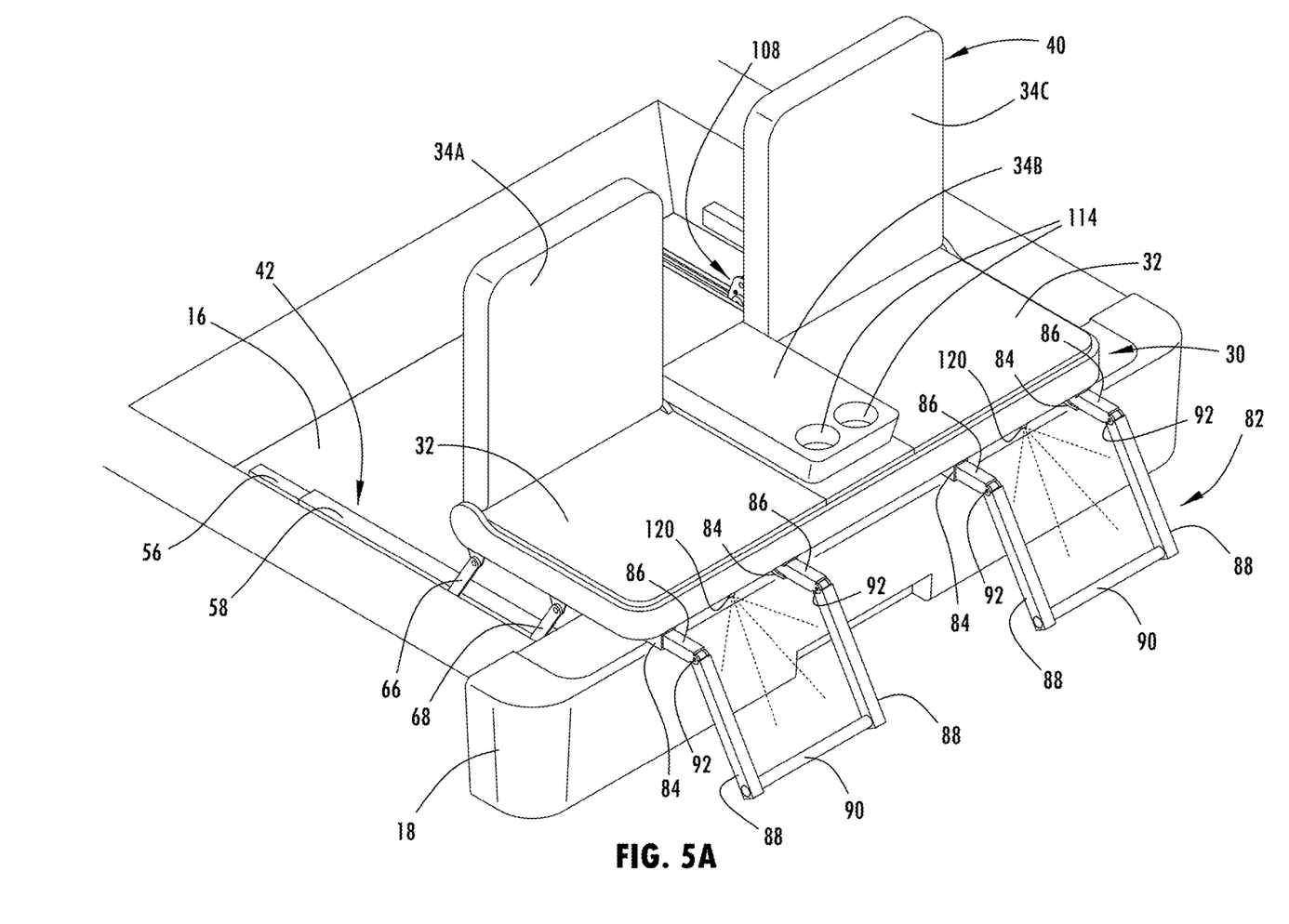
FIG. 5A is a rear perspective view of the seating assembly shown in a fully deployed tailgate position.
Figure 5B:
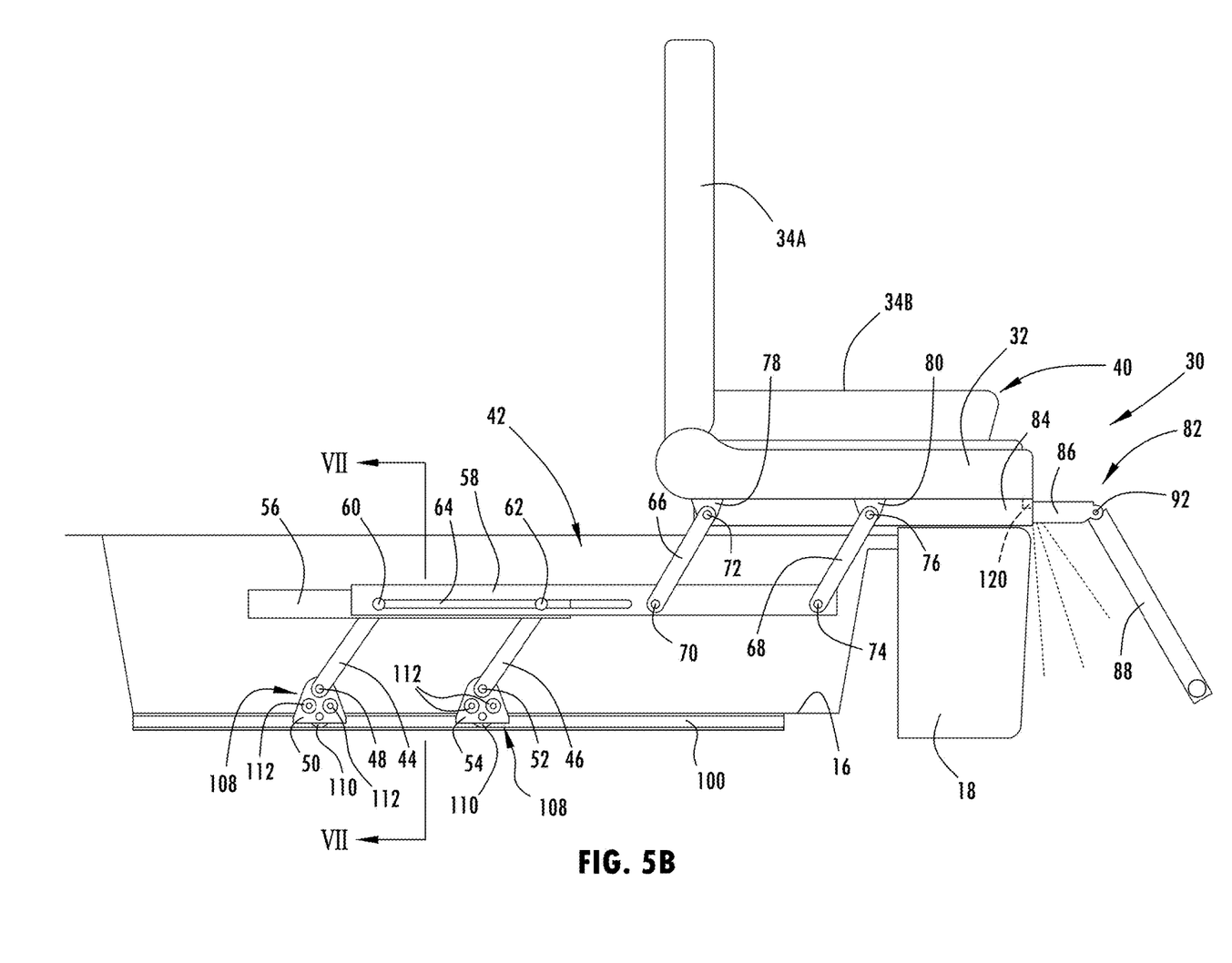
FIG. 5B is a side view of the seating assembly as shown in FIG. 5A in the fully deployed tailgate position.

During the initial deployment of the seat assembly 30 from the stowed position shown in FIGS. 2A and 2B to the fully deployed position shown in FIGS. 5A and 5B, the first and second pivot bars 44 and 46 are rotated such that the upper ends move upward and rearward by an angle θ of about 120°, according to one example, to move the seat 40 upward and rearward. Angle θ may be in the range of 90°-150°, according to one example. As such, the first and second pivot bars 44 and 46 are rotated upward to raise and move rearward the first rail 56 and the second rail 58 and seat 40 connected thereto as shown in FIGS. 4A and 4B. Additionally, with the seat 40 positioned above the floor well 98, the second rail 58 is extended to move rearward of the first rail 56 as shown to move the seat 40 further rearward.

The seat assembly 30 further includes an upper third pivot bar 66 and an upper fourth pivot bar 68, both connected at one end to the second rail 58 and at an upper end to support the seat 40. The third pivot bar 66 has a pivot pin 70 at the lower end to allow the third pivot bar 66 to pivot relative to the second rail 58 and further has a pivot pin 72 connected at the upper end to a seat base support 78, e.g., bracket on the bottom side of the seat 40. Similarly, the fourth pivot bar 68 has a pivot pin 74 located at the lower end connected to the second rail 58 and has further a pivot pin 76 at the upper end connected to a seat base support, e.g., bracket 80 on the underside of seat 40. The third and fourth pivot bars 66 and 68 may be rotated upward and rearward by an angle φ of approximately 120°, according to one example to thereby further lift the seat 40 and move the seat 40 further rearward. According to a further example, angle φ may be in the range of 90°-150°. With the third and fourth pivot bars 66 and 68 rotated upward and forward, the seat 40 is raised to a further elevated and rearward position as shown in FIGS. 4A and 4B. In this position, the seat 40 extends rearward of the rear end 18 of the vehicle 10 such as beyond the bumper to enable one or more users to be seated with the user's legs extending outward beyond the bumper in a tailgate seating position.

Referring to FIGS. 5A and 5B, the seat assembly 30 is further illustrated in the fully deployed tailgate seating position with the seat backs 34A and 34C unfolded to a substantially vertical position relative to the seat base 32. In the example shown, the first and third seat backs 34A and 34C are unfolded to an upright position to provide seating for two users, and the middle seat back 34B is in a folded downward position that serves as an armrest and provides a pair of drink holders 114. It should be appreciated that the middle seat back 34B may be unfolded to an upright position to provide a third seat for tailgate seating.

One or more lighting devices 120 may be located on the seat 40 proximate and front edge of the seat for illuminating an area rearward of the seat assembly in the use position. The one or more lighting devices 120 may include one or more LEDs oriented to emit light downward and rearward of the seat 40.

Figure 6:
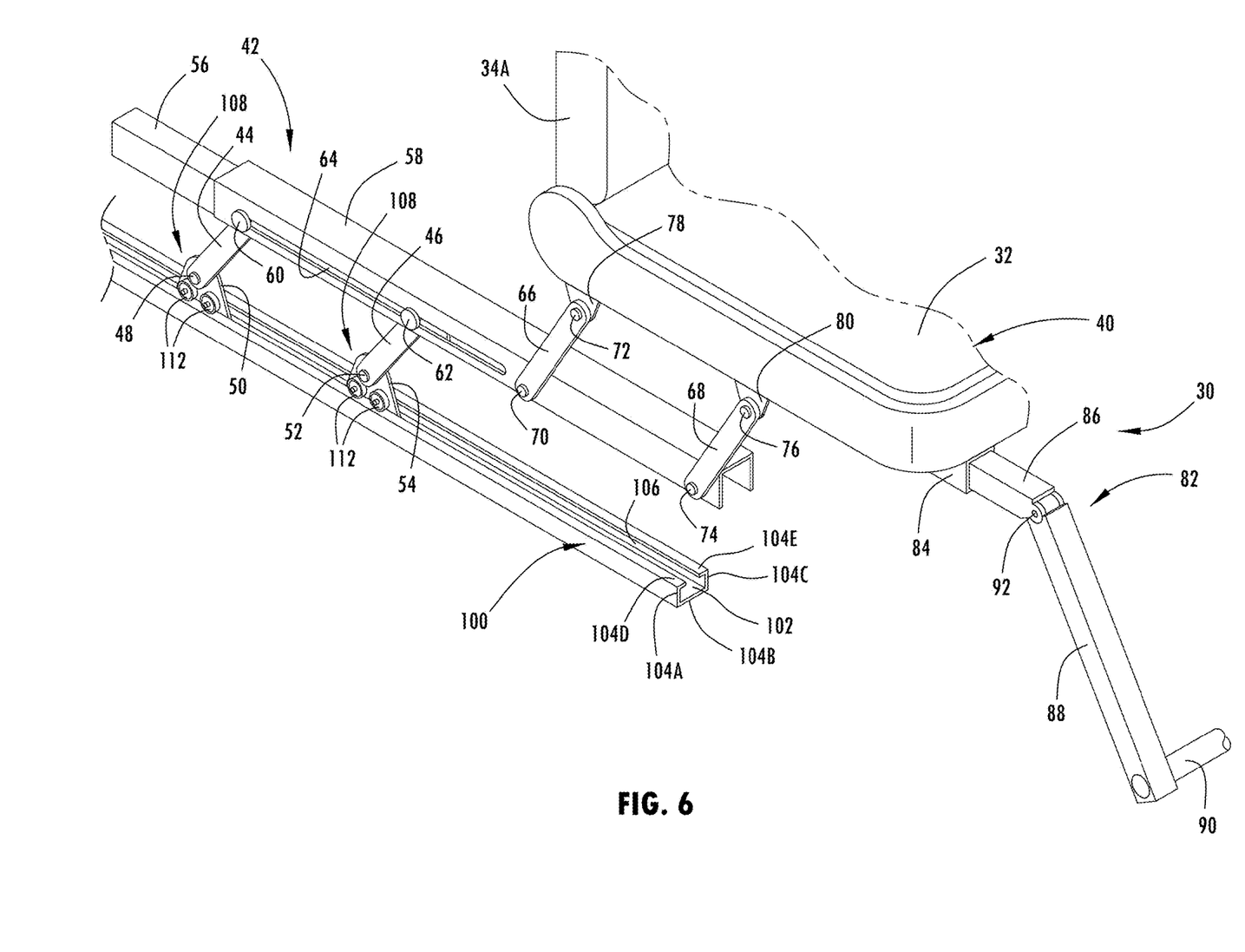
FIG. 6 is a partial perspective view of the seating assembly in the deployed tailgate position further showing a footrest deployed from below the seat assembly.

The seat assembly 30 further includes a pair of footrests 82 that are each deployable from a pair of housings 84 located under the seat 40. Each footrest 82 includes a pair of sliding or telescoping bars 86 extending from the pair of housings 84 that may be extended outward to a deployed position. Bars 86 are connected pivotally to extension bars 88 via pivots 92 and connect to a lower horizontal footrest bar 90. As such, the extendable bars 86 may pivot relative to bars 86 to position the footrest bar 90 at a position below the seat 40 and at a level to accommodate the feet of a user seated on the seat assembly 30. The footrest 82 may be pivoted upward and pushed into housing 84 to a stowed position.

A deployable seat assembly 30 may be manually actuated by a user between the stowed and deployed positions, according to one embodiment. In doing so, a user may grip the seat 40, such as the seat back or a handle connected to the seat 40 and pull the seat 40 upward and rearward with a force to cause the first and second pivot arms 44 and 46 to rotate upward and rearward, the second rail 58 to extend rearward from first rail 56, and to cause the third and fourth pivot arms 66 and 68 to rotate upwards and rearward to extend the seat further upward and rearward. Finally, the seat back, such as seat back 34A may be pivoted to an upright position. Additionally, the seat assembly 30 may be moved rearward or forward by pulling or pushing the seat 40 such that the brackets 50 and 54 slide with guide 108 on track 100 between forward and rearward positions. The seat assembly 30 may be fixed in the deployed position by using one or more locking devices. According to another embodiment, the seat assembly 30 may include one or more actuators, such as one or more electric motors, to cause the seat assembly 230 to move between the stowed and deployed positions.

Figure 7:
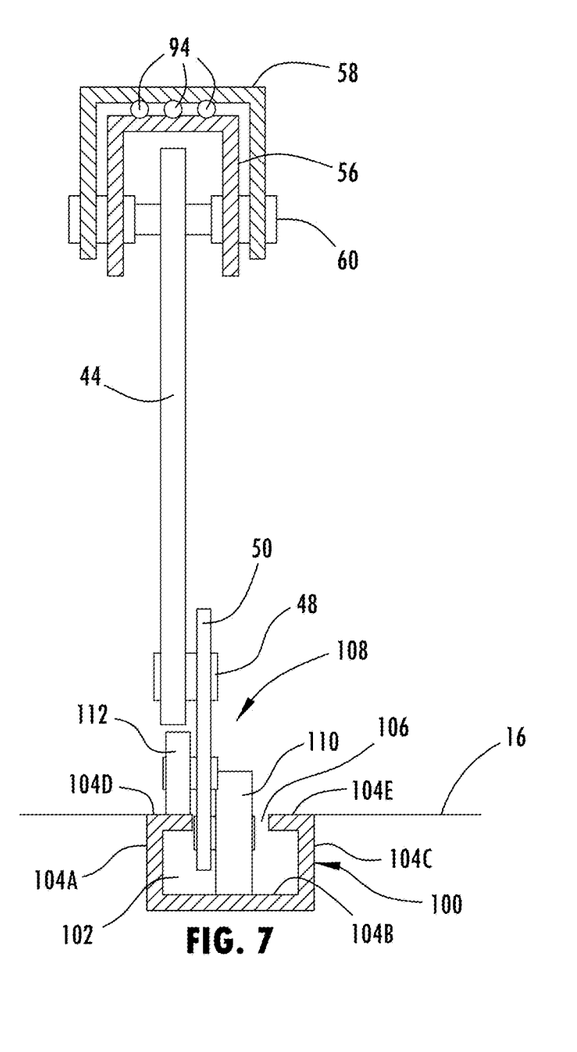
FIG. 7 is a cross-sectional view taken through the track and first and second rails of the seating assembly.

Referring to FIGS. 6 and 7, the first and second rails 56 and 58 are shown each having a U-shaped cross section and a ball bearing rack 94 operatively coupled therebetween to allow for sliding movement of the second rail 58 relative to the first rail 56. In addition, a pivot pin 60 extends through the first and second rails 56 and 58 to couple the first and second rails 56 and 58 together and allow the first pivot arm 44 to pivot.

The seat assembly 30 is supported on the vehicle floor. This may be achieved by fixing brackets 50 and 54 to the floor 16, according to one embodiment. According to the embodiment shown, the brackets 50 and 54 are connected to guides 108 which are assembled onto a pair of tracks 100 in FIGS. 6 and 7. The guides 108 is shown connecting the brackets 50 to the tracks 100 on the floor within the well. Each guide 108 includes a roller 110 disposed within a passageway 102 of the corresponding track 100. Track 100 is made up of two lateral side walls 104A and 104C, a bottom wall 104B and two partial upper walls 104D and 104E which provide a slot 106 therebetween. The roller 110 may rotate or roll within passageway 102. In addition, a pair of spring biased wheels 112 may be located on top of wall 104D and may be spring biased thereto to provide stability and allow the roller 110 to rotate within the track 100 between a forward and rearward position. The guide 108 on track 100 allows the seat assembly 30 to move forward and rearward to adjust the position of the seat 40.

Accordingly, the deployable seat assembly 30 advantageously provides a stowable and deployable rear facing tailgate seating that may be stowed within the cabin interior 14 inside a recessed well in the floor and deployed to a use position extending rearward from the tailgate area to seat one or more users when the vehicle is parked and the tailgate is in the open position.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle comprising:
   a cabin interior;
   a floor;
   a deployable seat assembly comprising:
      a pair of deployable seat support assemblies, each deployable seat support assembly comprising:
         first and second pivot bars pivotally supported on the floor;
         a first rail coupled to the first and second pivot bars, wherein the first rail is raised and lowered as the first and second pivot bars rotate between first and second bar positions; and
         a second rail slidingly extendable from the first rail;
      a seat supported by the second rail, wherein the seat faces rearward and extends rearward on the first rail as the second rail extends rearward away from the first rail, wherein the seat extends rearward of the cabin interior in a use position; and
   a tailgate at the rear of the cabin interior, wherein the tailgate is in an open position when the seat assembly is in the use position.

2. The vehicle of claim 1, wherein each of the seat support assemblies comprises third and fourth pivot bars coupled to the second rail and the seat, wherein the seat may be raised and lowered relative to the second rail as the third and fourth pivot bars rotate.

3. The vehicle of claim 2, wherein the third and fourth pivot bars pivot in the range of 90° to 150°.

4. The vehicle of claim 1, wherein the first and second pivot bars pivot in the range of 90° to 150°.

5. The vehicle of claim 1, further comprising a well recessed in the floor, wherein the seat is disposed at least partially within the well in a stowed position.

6. The vehicle of claim 1, wherein the rear facing seat comprises a seat base and a seat back.

7. The vehicle of claim 6, wherein the seat back pivots relative to the seat base between a folded position and a use position.

8. The vehicle of claim 1, wherein the second rail telescopes from the first rail.

9. The vehicle of claim 8, further comprising a ball bearing rack on at least one of the first and second rails.

10. The vehicle of claim 8, further comprising a pin connecting the second rail to the first rail.

11. The vehicle of claim 1, further comprising a footrest coupled to the seat assembly, wherein the footrest extends to a deployed footrest position from a stored footrest position.

12. The vehicle of claim 1, further comprising a lighting device proximate a front edge of the seat for illuminating an area rearward of the seat assembly in the use position.

13. A vehicle comprising:
    a cabin interior;
    a floor;

a deployable seat assembly comprising:
- a pair of deployable seat support assemblies, each deployable seat support assembly comprising:
  - first and second pivot bars pivotally supported on the floor;
  - a first rail coupled to the first and second pivot bars, wherein the first rail is raised and lowered as the first and second pivot bars rotate between first and second bar positions;
  - a second rail slidingly extendable from the first rail; and
  - third and fourth pivot bars coupled to the second rail, wherein the seat may be raised and lowered relative to the second rail;
- a seat supported by the second rail, wherein the seat faces rearward and extends rearward on the first rail as the second rail slides away from the first rail.

14. The vehicle of claim 13, further comprising a well recessed in the floor, wherein the seat assembly is disposed at least partially within the well in a stowed position.

15. The vehicle of claim 13, wherein the seat assembly extends rearward of the cabin interior in a use position.

16. The vehicle of claim 15, further comprising a tailgate at the rear of the cabin interior, wherein the tailgate in an open position when the seat assembly is in the use position.

17. A seat assembly for a vehicle, the seat assembly comprising:
- a pair of seat support assemblies, each seat support assembly comprising:
  - first and second pivot bars configured to be pivotally supported on a floor of the vehicle;
  - a first rail coupled to the first and second pivot bars, wherein the first rail is raised and lowered as the first and second pivot bars rotate between first and second pivot bar positions;
  - a second rail slidingly extendable from the first rail;
- a seat supported by the second rail, wherein the seat faces rearward and extends rearward on the first rail as the second rail slides away from the first rail; and
- each of the seat supported assemblies comprises third and fourth pivot bars coupled to the second rail and the seat assembly, wherein the seat assembly may be raised and lowered relative to the second rail as the third and fourth pivot bars rotate.

* * * * *